United States Patent
Balkus, Jr.

(10) Patent No.: US 8,752,571 B2
(45) Date of Patent: Jun. 17, 2014

(54) HEATING AND RELEASE VALVE ASSEMBLY FOR A FLUID RECEPTACLE

(76) Inventor: Carl E. Balkus, Jr., Happy Camp, CA (US)

( * ) Notice: Subject to any disclaimer, the term of this patent is extended or adjusted under 35 U.S.C. 154(b) by 936 days.

(21) Appl. No.: 12/889,748

(22) Filed: Sep. 24, 2010

(65) Prior Publication Data
US 2012/0073681 A1 Mar. 29, 2012

(51) Int. Cl.
F16K 17/40 (2006.01)
F16K 31/00 (2006.01)
F16K 31/02 (2006.01)
F16K 17/36 (2006.01)

(52) U.S. Cl.
CPC .............. F16K 31/025 (2013.01); F16K 31/003 (2013.01); F16K 17/36 (2013.01)
USPC ............................................. 137/72; 137/468

(58) Field of Classification Search
CPC ................................ F16K 17/04; F16K 17/383
USPC ........... 137/457, 468, 68.13, 72, 74, 80, 89.4, 137/73; 251/68
See application file for complete search history.

(56) References Cited

U.S. PATENT DOCUMENTS

| | | |
|---|---|---|
| 2,760,343 A | 8/1956 | Reed |
| 3,709,255 A | 1/1973 | Ciotti |
| 4,164,953 A | 8/1979 | Naab |
| 4,932,431 A | 6/1990 | Silagy |
| 5,213,128 A | 5/1993 | Baird |
| 5,632,297 A | 5/1997 | Sciullo |
| 5,743,285 A | 4/1998 | Shalkevich |
| 5,941,269 A | 8/1999 | Ingle |
| 6,367,499 B1 * | 4/2002 | Taku ............................... 137/72 |
| 6,814,097 B2 | 11/2004 | Girouard |
| 6,851,445 B2 | 2/2005 | Girouard |

* cited by examiner

Primary Examiner — Kevin Lee
Assistant Examiner — P. Macade Nichols
(74) Attorney, Agent, or Firm — Neustel Law Offices (57) ABSTRACT

The valve assembly includes a body having a communication passage with an inlet and an outlet and a combustion chamber having a propellant and one or more openings, an igniter in communication with the propellant, and a valve means movable within the body. The igniter is adapted to ignite the propellant to provide a force to move the valve means from a closed position to an open position. The valve means has a first restricting element to restrict and permit passage of a pressurized gas through the outlet and a second restricting element to restrict and permit passage of heat from the burned propellant through the openings of the body, wherein the heat/gases cause a pressurized gas within the receptacle to expand causing the gas to quickly expunge from the receptacle. A biasing means may be used with the valve means to retain the valve means in the closed position.

18 Claims, 7 Drawing Sheets

HEATING AND RELEASE VALVE ASSEMBLY FOR A FLUID RECEPTACLE

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a valve and more specifically it relates to a propellant operated heating release valve assembly for a gas receptacle to efficiently and quickly expunge pressurized gas from a tank.

2. Description of the Related Art

Any discussion of the related art throughout the specification should in no way be considered as an admission that such related art is widely known or forms part of common general knowledge in the field.

Release valves have been in use for years upon pressurized gas tanks. Typically, release valves may comprise a standard fill port that may be opened and closed, wherein opening the valve allows the pressurized gas to escape from the tank. However, it can often be difficult and time consuming to open the valve and for all of the pressurized gas to expunge from the tank. Because of the inherent problems with the related art, the cooling and reducing pressure of the expanding and escaping gas, there is a need for a new and improved heating and release valve assembly for a gas receptacle to efficiently and quickly expunge pressurized gas from a tank, wherein by increasing the temperature within the receptacle will increase the pressurized volume within the receptacle and ensure a more complete expulsion of the receptacle contents.

BRIEF SUMMARY OF THE INVENTION

A system to efficiently and quickly expunge pressurized gas from a tank. The invention generally relates to a valve which includes a body having a communication passage with an inlet and an outlet and a combustion chamber having a propellant and one or more openings, an igniter in communication with the propellant, and a valve means movable within the body. The igniter is adapted to ignite the propellant to provide a force to move the valve means from a closed position to an open position. The valve means has a first restricting element to restrict and permit passage of a pressurized gas through the outlet and a second restricting element to restrict and permit passage of heat from the burned propellant through the openings of the body, wherein the heat causes a pressurized gas within the receptacle to expand causing the gas to quickly expunge from the receptacle. A biasing means may be used with the valve means to retain the valve means in the closed position.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 7 illustrate a heating and release valve assembly for a fluid receptacle 10, which comprises a body 20 having a communication passage 30 with an inlet 31 and an outlet 33 and a combustion chamber 40 having a propellant 48, 49 and one or more openings 44, an igniter 50 in communication with the propellant 48, 49, and a valve 60 means movable within the body 20. The igniter 50 is adapted to ignite the propellant 48, 49 to provide a force to move the valve 60 means from a closed position to an open position.

The valve means 60 has a restricting element 61 to restrict and permit passage of a pressurized gas 16 through the outlet 33 and a restricting element 68 to restrict and permit passage of heat 14 from the burned propellant 48, 49 through the openings 44 of the body 20, wherein the heat 14 causes a pressurized gas 16 within the receptacle 12 to expand causing the gas 16 to quickly expunge from the receptacle 12. The gases from the burned propellant 48, 49 add to the volume of pressurized gas 16 within the receptacle thus more quickly forcing the pressurized gas 16 to exit the receptacle 12. A biasing means 70 may be used with the valve means 60 to retain the valve means 60 in the closed position.

Various types of receptacles 12 may be used with the present invention, such as but not limited to cylinders, tanks, etc. Additionally, various types of pressurized fluids 16 may be expunged from the receptacle 12 via the present invention, such as propane, natural gas, etc. The receptacle 12 may also include a port and a conventional valve 60 for filling and normal use of the receptacle 12.

B. Valve Body

The body 20 is generally comprised of a cylindrical structure adapted to be coupled to an opening of a receptacle 12 so that the body 20 extends within the interior of the receptacle 12 and is in communication with the exterior of the receptacle 12 for permitting pressurized gas 16 to be expunged from the receptacle 12. The body 20 is generally linear from a first end 21 to a second end 23 as defined by the linear sidewalls 25.

The body 20 may be attached to the receptacle 12 in various manners, such as but not limited to in a threadable manner as illustrated by threads 22 along the end portion 26 of the first end 21. The body 20 is shown to be connected to the bottom of the receptacle 12; however it is appreciated that the body 20 may be connected to the receptacle 12 at various locations, such as the side or top. Additionally, larger or numerous release valves 10 or combustion chambers 40 may be used for larger receptacles 12 with various ignition timing mechanisms or settings or activated at various pressures. A nut 24a and rubber seal ring 24b may be used to attach to the threads 22 of the first end 21 to seal the body 20 to the receptacle 12.

The body 20 includes a communication passage 30 located adjacent the first end 21, wherein the communication passage 30 includes one or more inlets 31 extending through the sidewall 25 adjacent the first end 21 and in communication with the interior of the receptacle 12 and an outlet 33 extending through an end portion 26 of the body 20 and in communication with the exterior of the body 20 and receptacle 12.

The present invention preferably includes a plurality of inlets 31 spaced around a perimeter of the communications passage 30 to allow adequate flow of the pressurized gas 16 within the communication passage 30 and through the outlet 33. The inlets 31 may be comprised of various shapes, such as but not limited to a rectangular shape. A seal member 36 is also preferably located within the communication passage 30 upon the end portion 26 for receiving the valve 60 and providing a fluid seal around the outlet 33 when the valve 60 is in the first position (i.e. closed).

Linearly extending from the communication passage 30 is the combustion chamber 40, wherein a partition 27 preferably laterally extends across the body 20 to separate the communication passage 30 from the combustion chamber 40. The partition 27 preferably includes an opening 28 extending centrally therethrough, wherein a seal member 29, such as a resilient ring, is seated within the opening 28 to receive the shaft 62 of the valve 60 and provide a fluid seal between the communication passage 30 and the combustion chamber 40. The partition 27 may or may not be integral with the sidewall 25 and the body 20.

The combustion chamber 40 generally contains the propellant 48, 49 which is used to actuate the valve 60 and speed an expunging process of the gas 16 from the receptacle 12. The combustion chamber 40 generally includes a first portion 41 and a second portion 42, wherein the second portion 42 linearly extends from the first portion 41. The first portion 41 and the second portion 42 are generally integral and are only characterized for description purposes to adequately describe the structure of the combustion chamber 40.

An opening 46 extends through the sidewall 25 leading to the first portion 41 for receiving the wire 54 of the igniter 50. The wire 54 is generally embedded within the first propellant 48 within the first portion 41 or in communication with the first propellant 48 to ignite the first propellant 48 when the igniter 50 is engaged.

Additionally, a plurality of openings 44 spaced around a perimeter of the second portion 42 of the combustion chamber 40 to allow adequate flow of the heat 14 from the burned propellant 48, 49 into the interior of the receptacle 12 surrounding the valve body 20. The openings 44 may be comprised of various shapes, such as but not limited to a circular shape. When the valve 60 is in the second position, the valve 60 permits the first portion 41 of the combustion chamber 40 to fluidly connect to the second portion 42 of the combustion chamber 40, thus allowing the heat 14 and gases produced by the burning or burned propellant 48, 49 to exit the body 20 through the openings 44 and warm the surrounding pressurized gas 16 causing the gas 16 to expand so that the gas 16 may more quickly be expunged from the receptacle 12.

Generally, two types of propellants 48, 49 are used within the combustion chamber 40. A first type of propellant 48 being a fast burning propellant to initiate the movement of the valve 60 and jam the valve 60 open in the second position. A second type of propellant 49 being a slow burning propellant is used to supply heat to expand the gas as is passes the valve 60 for a longer duration needed to expunge the receptacle 12 of the pressurized gas 16. Various internal barriers may be used to keep the first propellant 48 and the second propellant 49 separate prior to use as appreciated. Various types of propellants 48, 49 or flammable fluids may be utilized as appreciated all which are useful in outputting warmth and providing a thrusting force that may be directed towards the restricting member 68 to move the valve 60.

C. Igniter

The igniter 50 is used to ignite the propellant 49. The igniter 50 generally includes a switch 52 which is located externally to the receptacle 12 and may be secured to the walls of the receptacle 12 or in various other locations. The switch 52 is generally manually activated, such as being comprised of a push-button switch or various other structures. Extending from the switch 52 internal to the receptacle 12 is a connecting wire 54 having an igniting end 56 which is secured to the body 20 and extends through the opening to connect with the first propellant 48.

It is appreciated that the switch 52 may be locked in the engaged position or may require the user to continually depress the switch 52. Preferably, once the first propellant 48 is ignited, the burning of the first propellant 48 causes the second propellant 49 to ignite without reengaging the switch 52.

D. Valve

The valve 60 is generally used to restrict and permit passage of gases 16 through the outlet 33 and also is used to supply and permit passage of heat 14 through the openings 44 of the second portion 42 of the combustion chamber 40. As stated, the valve 60 is slidably movable within the body 20 from a first position to a second position. The valve 60 may be comprised of an integral structure or multiple components.

The valve 60 generally includes a restricting element 61 adjacent the first end 21 of the valve 60 to restrict and permit passage of the gas 16 through the outlet 33. The restricting element 61 may be comprised of various structures all which are able to be pressed tightly against the end portion 26 upon the seal member 36 to fluidly seal the outlet 33 when in the first position and move within the communication passage 30 towards the partition 27 in the second position. The restricting element 61 may also be tapered on an upper end to better catch within the opening 28 of the partition 27 to retain the valve 60 in the second position.

Extending from the restricting element 61 is a shaft 62. The shaft 62 extends through the partition 27 and into the combustion chamber 40 where the shaft 62 interconnects with the restricting element 68 or plunger. The shaft 62 is generally comprised of an elongated and linear structure having a first portion 63 and a linearly extending second portion 64. The first portion 63 extends from the restricting element 61 and is generally tapered, wherein the first portion 63 tapers inwardly to a width substantially equal to the diameter of the opening 28 of the partition 27. As the shaft 62 moves toward the second end 23 of the body 20, the increasing diameter of the first portion 63 of the shaft 62 extending through the opening 28 eventually catches upon the seal member 29 and the opening 28 and the shaft 62 is retained in a longitudinal position within the opening 28 thus substantially retaining the valve 60 in the second position.

The second portion 64 extends from the first portion 63 and is generally located within the combustion chamber 40. The end of the second portion 64 has threads 65 to receive the restricting element 68. The second portion 64 of the shaft 62 is further substantially hollow thus defining a cavity 66 extending therein to receive the guide rod 71 and biasing member 73 of the biasing assembly 70 for providing a biasing force towards the first position to assist in keeping the valve 60 in the first position when the propellant 48, 49 is not ignited.

The restricting element 68 is generally comprised of a circular structure having a diameter similar to the inner diameter of the combustion chamber 40 within the body 20. The restricting element 68 also includes a seal member 69, such as a resilient ring, surrounding or following an outer perimeter to ensure that the as the restricting element 68 moves within the combustion chamber 40 along the interior of the walls 25 of the body 20.

E. Biasing Assembly

The biasing assembly 70 is used to provide a biasing force to the valve 60 to ensure that the valve 60 remains in the first position when the gas is injected into the receptacle 12. It is appreciated that the pressure from the pressurized gas 16 is also useful in retaining the valve 60 in the first position.

The biasing assembly 70 generally includes an elongated guide rod 71 that is supported within the cavity 66 of the shaft 62 of the valve 60 on one end and is guided through an opening extending through an outer support 75 on the other end. A bias member 73 surrounds the guide rod 71 and extends between the outer support 75 and the inner end of the cavity 66 to provide a biasing force to the valve 60. Various other types of biasing assemblies may be utilized as appreciated.

F. Operation of Preferred Embodiment

Figure 1:
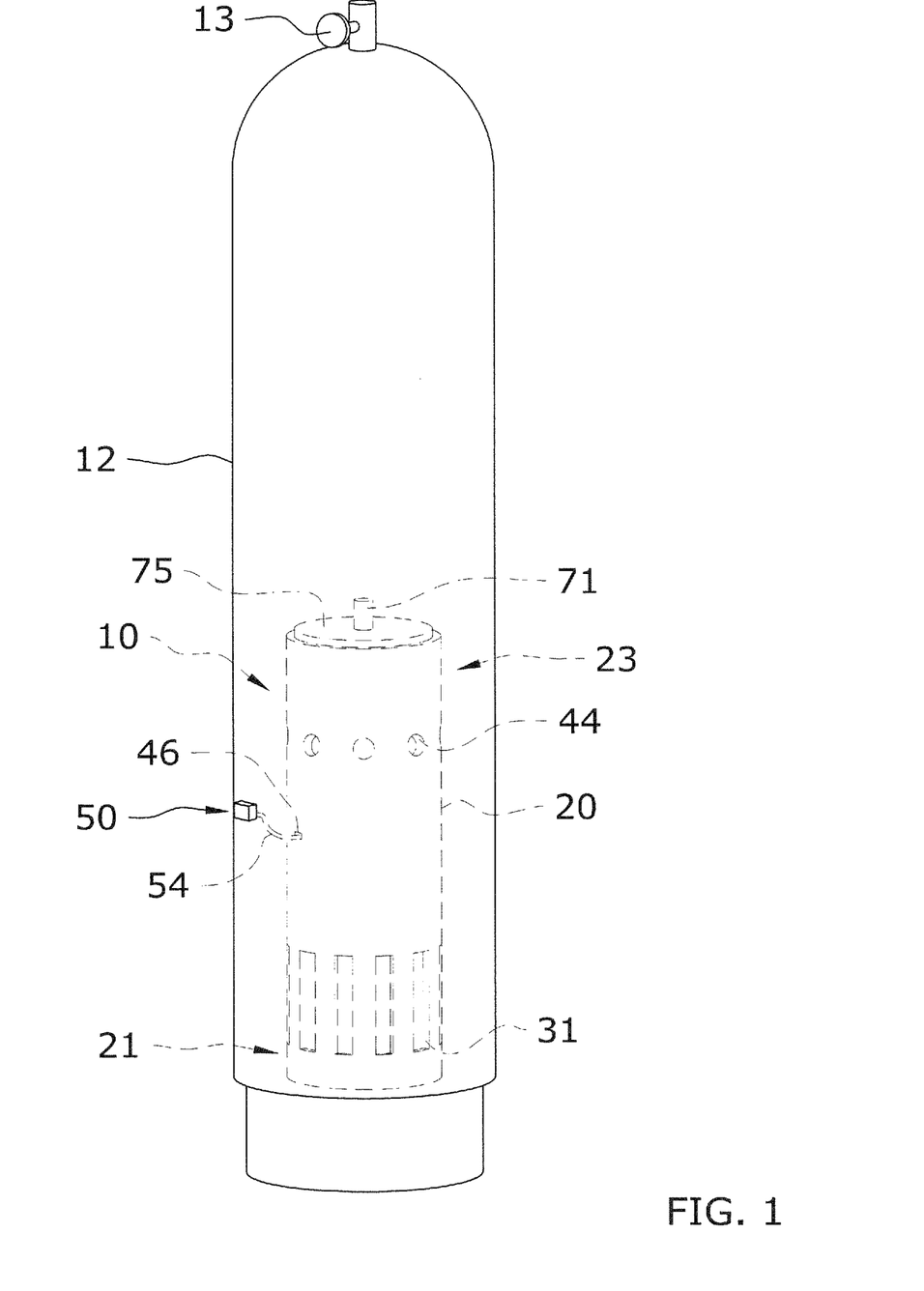
FIG. 1 is an upper perspective view of the present invention within the receptacle.
Figure 2:
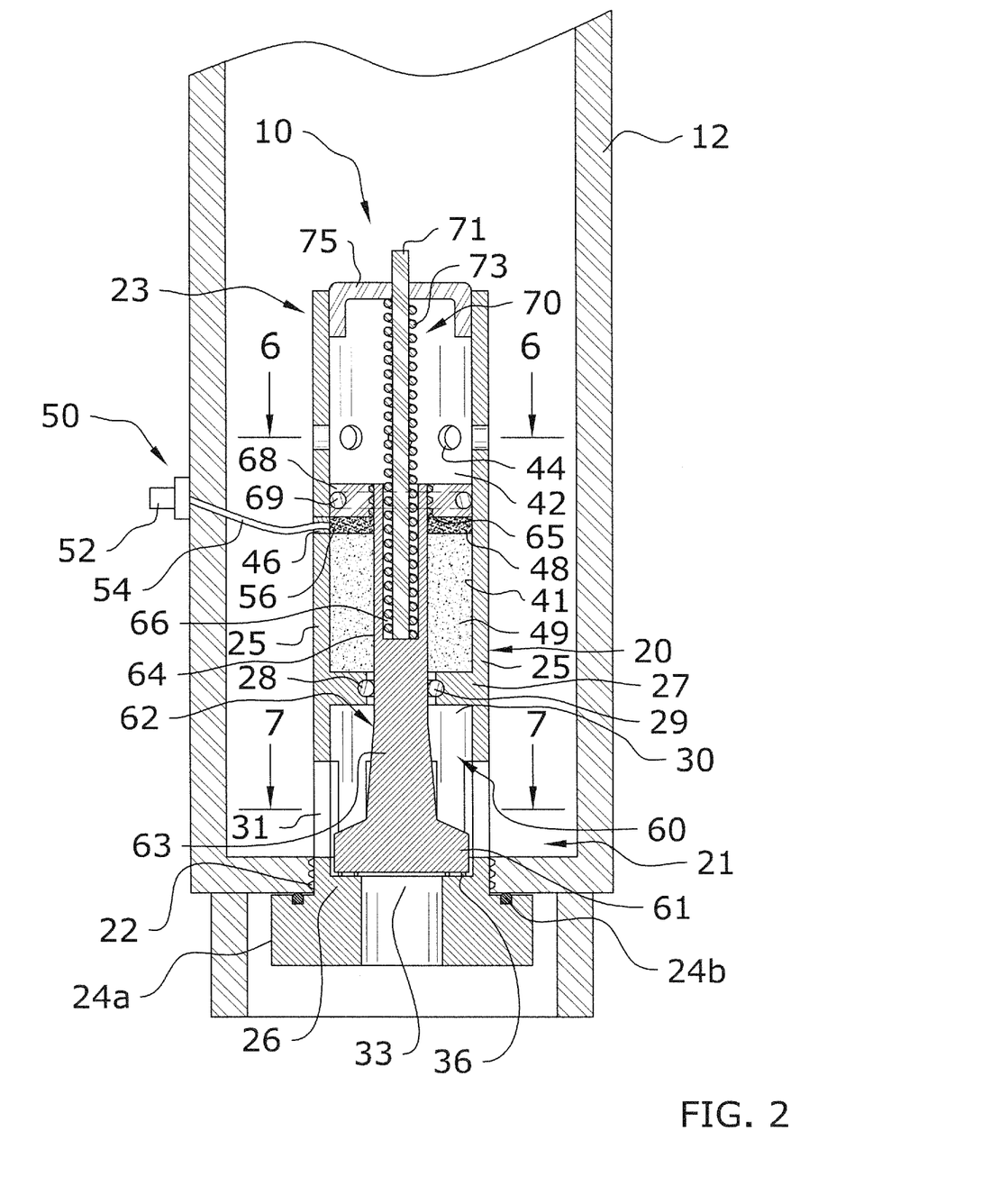
FIG. 2 is a cross-sectional view of the present invention with the valve in the first position.
Figure 3:
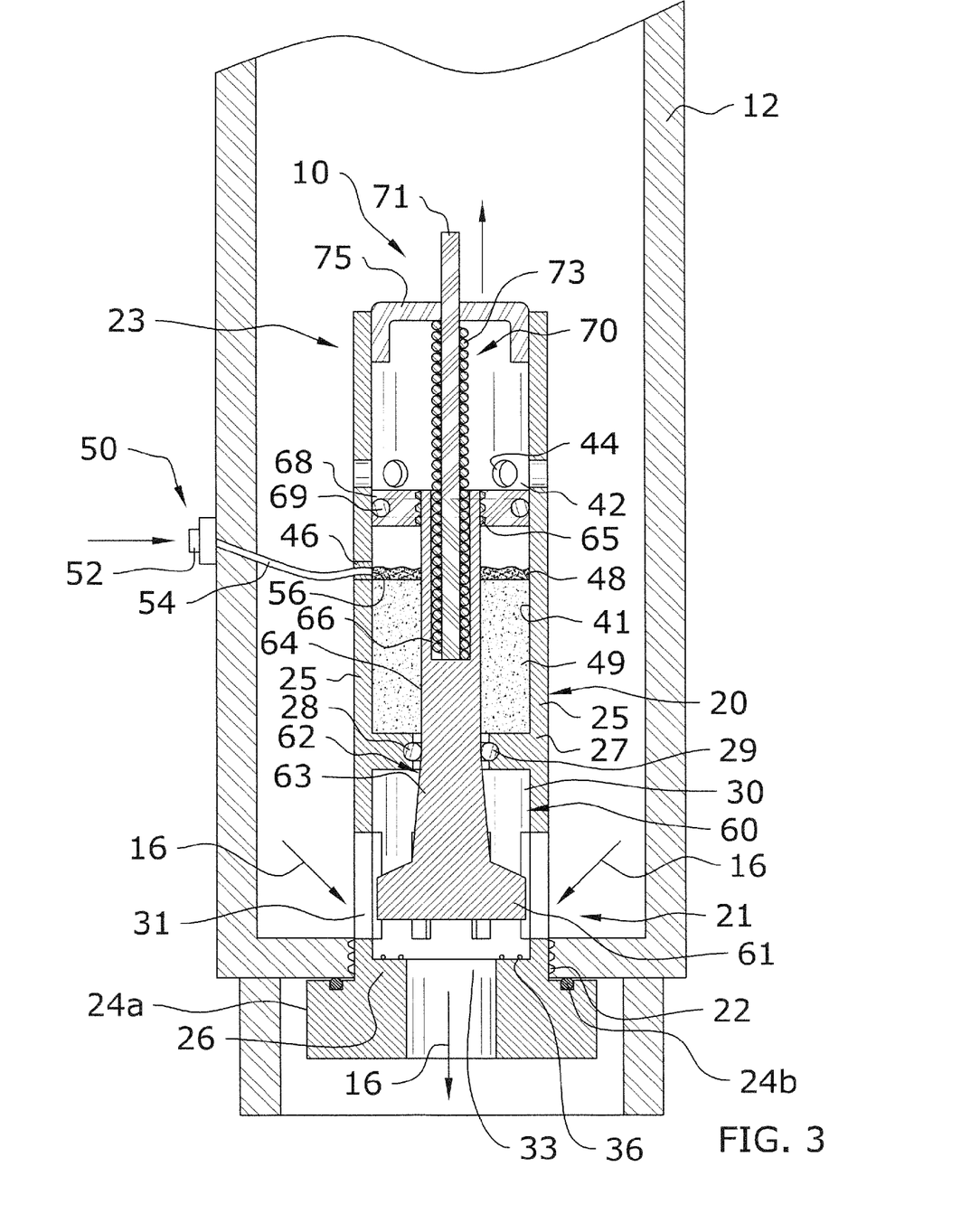
FIG. 3 is a cross-sectional view of the present invention with the switch of the igniter engaged to ignite the propellant to move the valve towards the second position.
Figure 4:
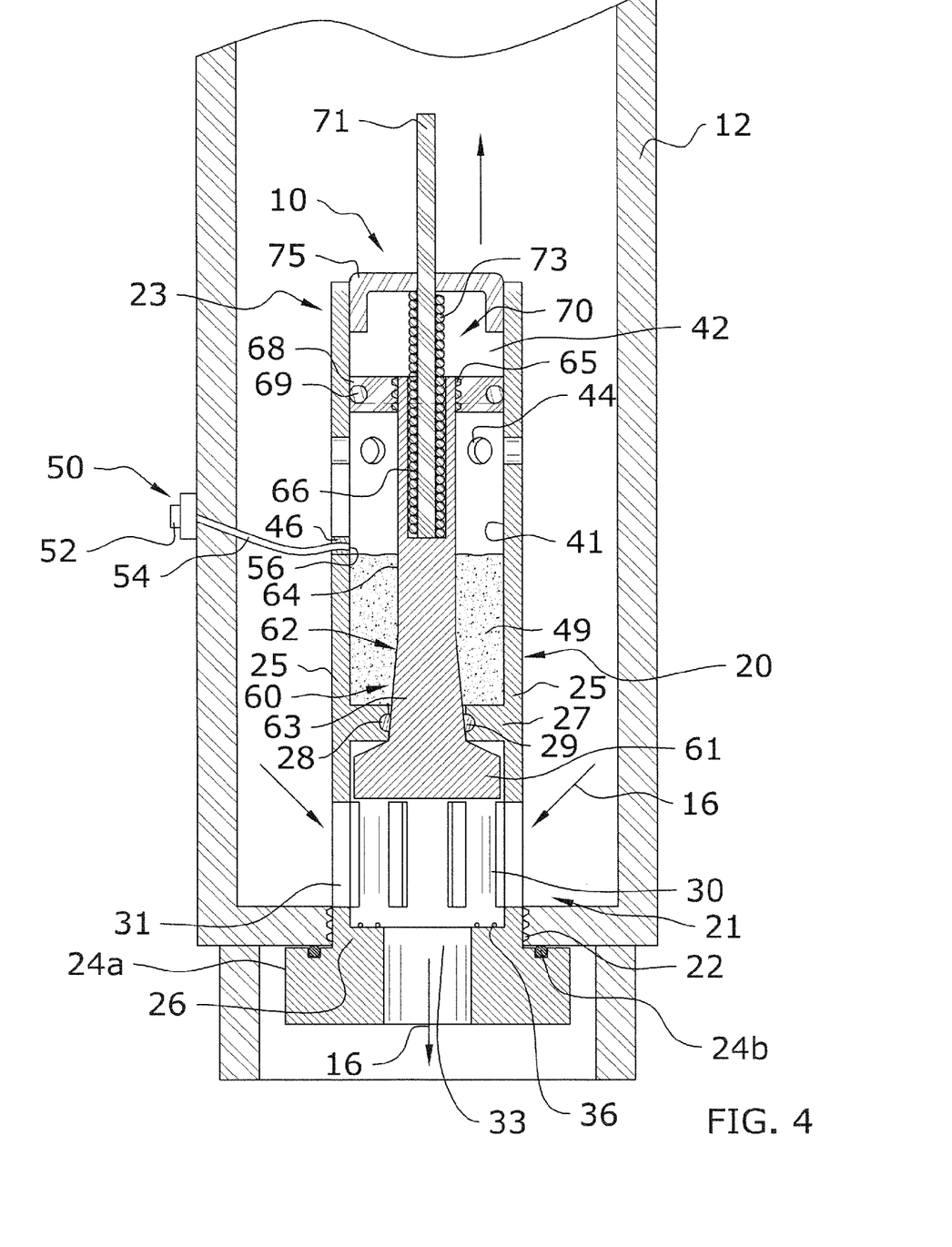
FIG. 4 is a cross-sectional view of the present invention within the valve lodged in the second position.

In use, when the gas 16 from the receptacle 12 is desired to be released in a fast and complete manner, the switch 52 is engaged to cause the igniting end 56 of the igniter 50 to ignite the first propellant 48. The first propellant 48 ignites and outputs a force against the restricting element 68 to cause the restricting element 68 and valve 60 to linearly move towards the second end 23 thus causing the restricting element 61 to move away from the outlet 33 and allow gas 16 to start escaping the receptacle 12 through the outlet 33 as illustrated in FIG. 2. The first propellant 48 continues to burn and ignites the second propellant 49, both of which generate heat and pressure within the combustion chamber 40 and provide a thrust to move the valve 60 towards the second end 23 of the body 20 as illustrated in FIGS. 3 and 4.

Figure 5:
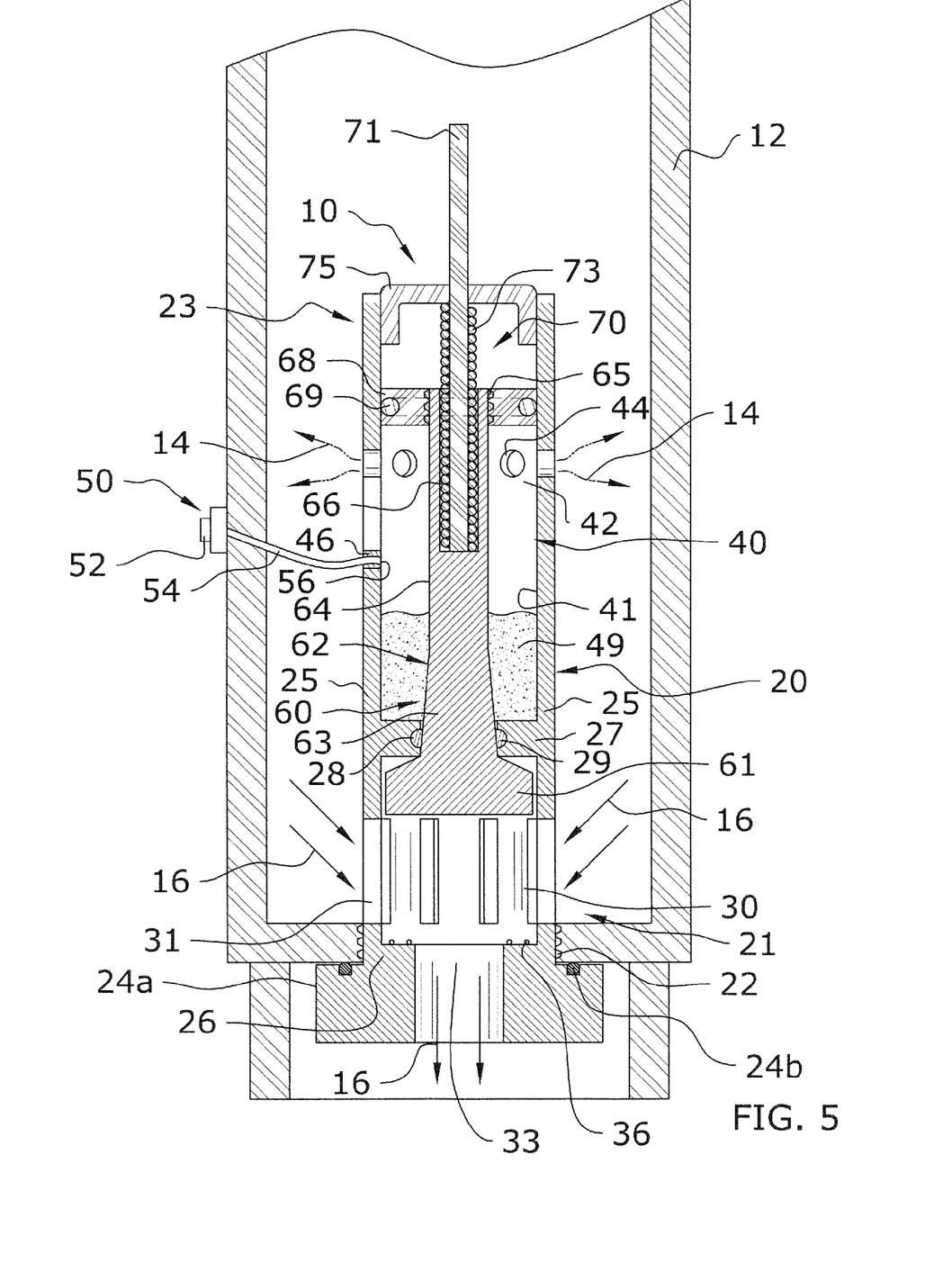
FIG. 5 is a cross-sectional view of the present invention with the valve in the second position and heat escaping through the openings to cause the surrounding gasses to expand and more quickly be expunged from the receptacle.
Figure 6:
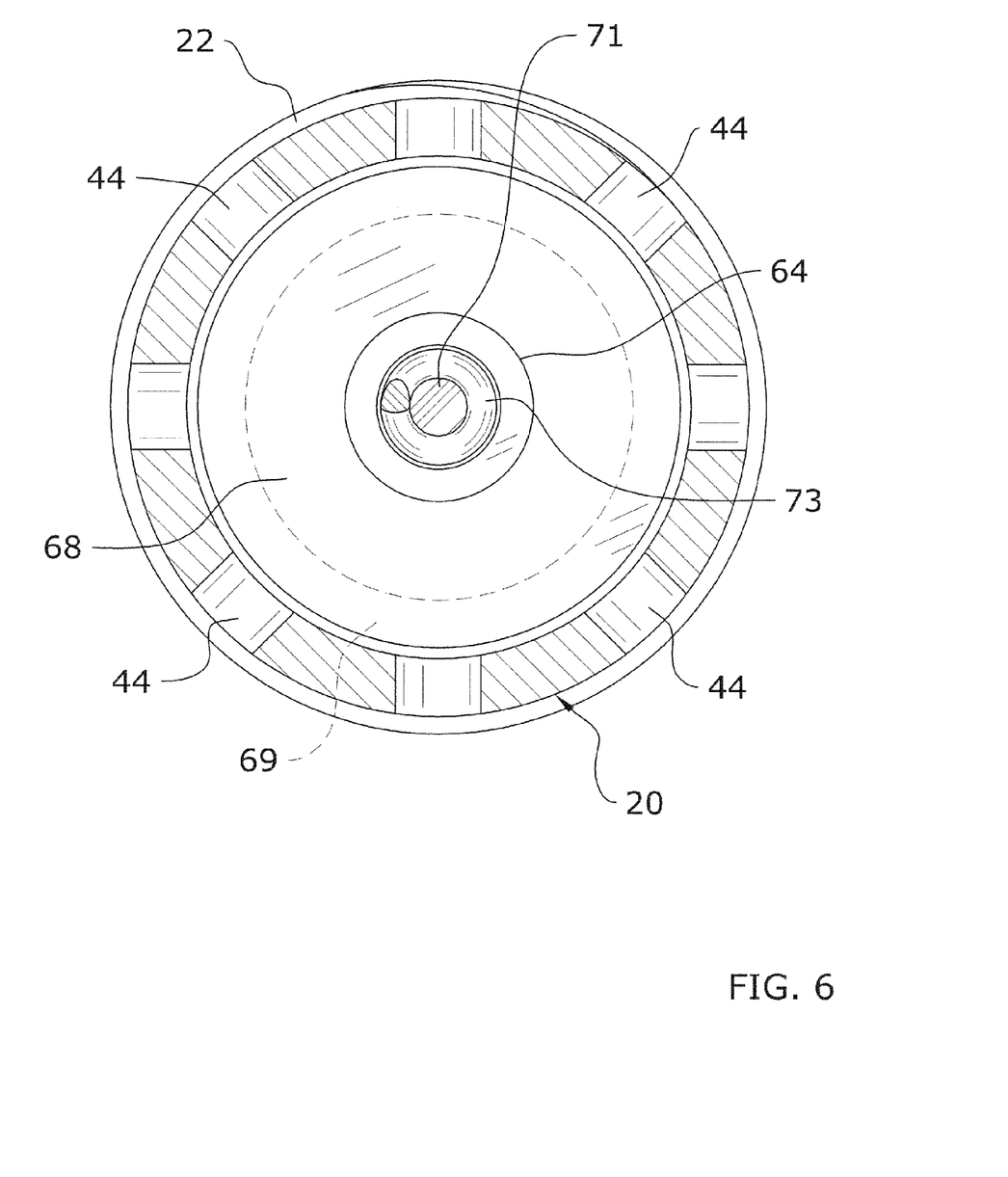
FIG. 6 is a sectional view taken along lines 6-6 of FIG. 2 with the receptacle removed.
Figure 7:
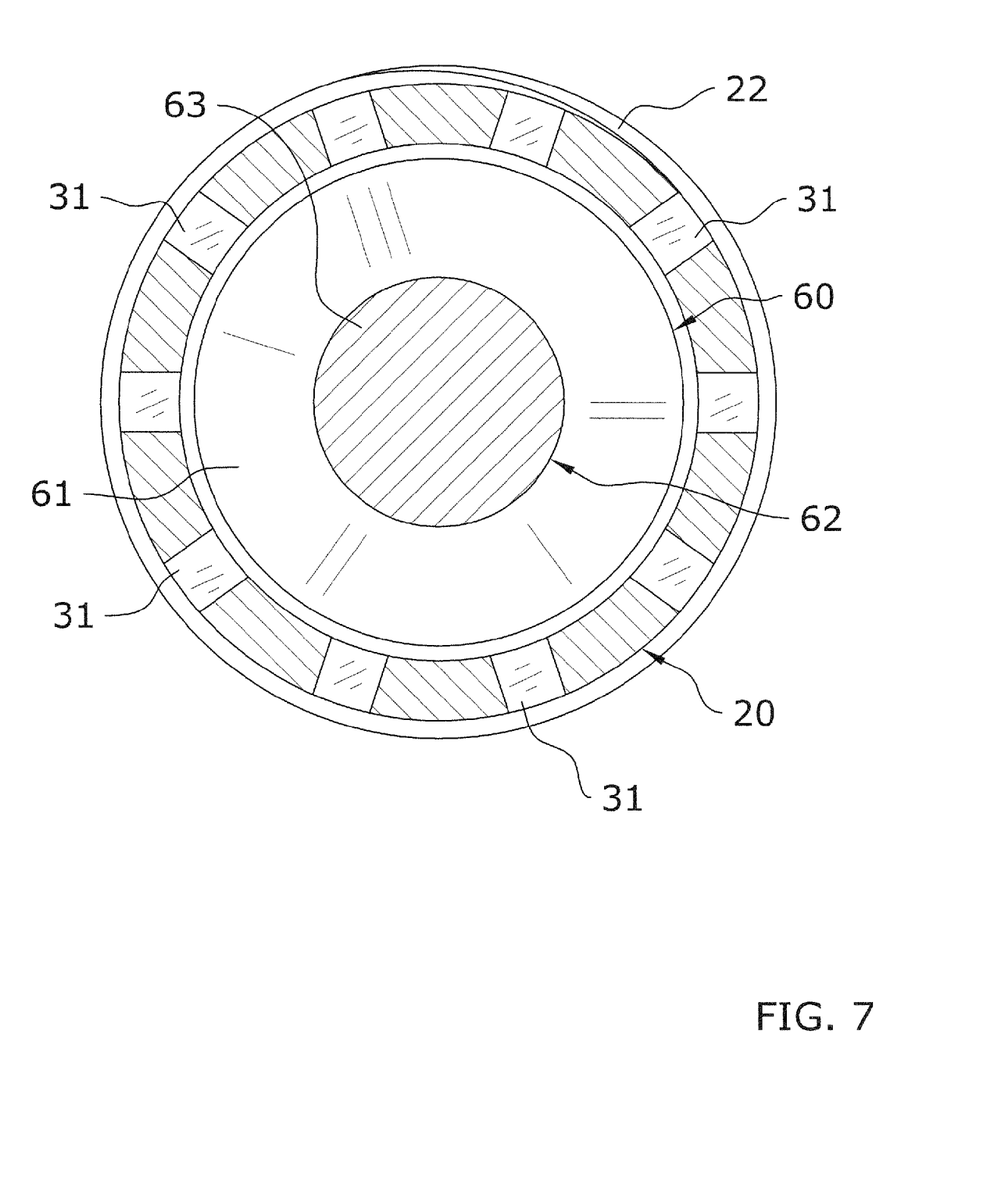
FIG. 7 is a sectional view taken along lines 7-7 of FIG. 2 with the receptacle removed.

As the shaft 62 moves toward the second end 23, the increasing diameter of the first portion 63 eventually causes the first portion 63 to become lodged within the opening 28 of the partition 27 as shown in FIG. 5. When the shaft 62 becomes lodged within the opening 28 of the partition 27, the restricting element 68 passes the openings 44 of the second portion 42 at the second end 23 of the body 20, thus exposing the openings 44 to the second portion 42 of the combustion chamber 40 to allow the heat 14 from the burned propellant 48, 49 to escape the combustion chamber 40 through the openings 44 and interact with the pressurized gas 16 within the interior of the receptacle 12 as illustrated in FIG. 5.

The interaction with the heat and gases 14 of the burned propellant 48, 49 with the pressurized gas 16 causes the gas 16 to expand which increases an available volume of the pressurized gas 16 within the receptacle 12 and causes the gas 16 to more quickly move towards the communication passage 30 and escape the receptacle 12 through the outlet. After all of the gas 16 has escaped the receptacle 12, the body 20 may be threadably removed from the receptacle 12 and reset by dislodging the shaft 62 from the opening 28 of the partition 27 thus causing the bias member 73 to return the valve 60 to the first position and the combustion chamber 40 may be refilled with additional propellant 48, 49. Various other refilling and resetting procedures may alternately be used.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A release valve for a pressurized receptacle having a gas therein, said release valve comprising:
   a body having a first end and a second end;
   said body having a communication passage with at least one inlet and an outlet on said first end and a combustion chamber having at least one opening along said second end;
   a propellant positioned within said combustion chamber;
   an igniter in communication with said propellant, said igniter adapted to ignite said propellant within said combustion chamber, wherein said igniter has a switch, said switch adapted to be manually engaged to cause said igniter to ignite said propellant; and
   a valve means movable within said body and extending between said first end and said second end, said valve means movable from a first position to a second position via a thrust of said ignited propellant;
   said valve means having a first restricting element within said communication passage, said first restricting element adapted to restrict passage of said gas through said outlet in said first position and adapted to permit passage of said gas through said outlet in said second position;

said valve means having a second restricting element within said combustion chamber, said second restricting element adapted to restrict passage of heat from said burned propellant through said at least one opening in said first position and adapted to permit passage of heat from said burned propellant through said at least one opening in said second position;

said heat from said burned propellant adapted to cause gas within said receptacle to expand and said gases from said burned propellant adapted to add to volume of stored gas expunged through said at least one opening.

2. The release valve of claim 1, wherein said first end has a plurality of threads adapted to removably attach said body to said receptacle.

3. The release valve of claim 1, wherein said valve means has a shaft connecting said first restricting element and said second restricting element, wherein said shaft includes a tapered portion and wherein said shaft extends through an opening of a partition separating said communication passage from said combustion chamber, wherein said tapered portion of said shaft is adapted to be lodged in said opening of said partition when said valve moves from said first position to said second position.

4. The release valve of claim 1, including a biasing assembly to provide a biasing force against said valve means.

5. The release valve of claim 4, wherein said biasing assembly includes a spring to provide said biasing force.

6. The release valve of claim 1, wherein said second restricting element includes a seal member.

7. The release valve of claim 1, wherein said at least one inlet includes a plurality of inlets spaced around a perimeter of said communication passageway.

8. The release valve of claim 1, wherein said at least one opening includes a plurality of openings spaced around a perimeter of said combustion chamber.

9. The release valve of claim 1, wherein said propellant includes a first propellant and a second propellant, wherein said first propellant is adapted to burn at a faster rate than said second propellant.

10. A release valve for a receptacle having a pressurized gas therein, said release valve comprising:
a body having a communication passage and a combustion chamber, said communication passage having an inlet and an outlet, and said combustion chamber having at least one opening and a propellant therein;
an igniter in communication with said propellant;
a valve means movable within said body, said valve means movable between a first position and a second position;
said valve means having a first restricting element within said communication passage to restrict in said first position and permit in said second position passage of a pressurized gas through said outlet;
said valve means having a second restricting element within said combustion chamber to restrict in said first position and permit in said second position passage of heat from said burned propellant through said at least one opening of the body;
said igniter adapted to ignite said propellant causing said propellant to burn and to force said valve means from said first position to said second position, wherein heat from said burned propellant is adapted to cause a pressurized gas within said receptacle to expand and said gases from said burned propellant adapted to add to volume of stored gas expunged through said at least one opening causing said pressurized gas to expunge from said receptacle, wherein said propellant includes a first propellant and a second propellant wherein said first propellant is adapted to burn at a faster rate than said second propellant; and
a biasing means in communication with said body to provide a biasing force to said valve means toward said first position.

11. The release valve of claim 10, wherein said first end has a plurality of threads adapted to removably attach said body to said receptacle, said first end having a seal member around said plurality of threads for sealing said body to said receptacle.

12. The release valve of claim 10, wherein said igniter has a manually-activated switch, said switch adapted to be manually engaged to cause said igniter to ignite said propellant.

13. The release valve of claim 10, wherein said valve means has a shaft connecting said first restricting element and said second restricting element, wherein said shaft includes a tapered portion and wherein said shaft extends through an opening of a partition separating said communication passage from said combustion chamber, wherein said tapered portion of said shaft is adapted to be lodged in said opening of said partition when said valve moves from said first position to said second position.

14. The release valve of claim 10, wherein said biasing means includes a spring to provide said biasing force.

15. The release valve of claim 10, wherein said first and second restricting elements includes a seal member.

16. The release valve of claim 10, wherein said at least one inlet includes a plurality of inlets spaced around a perimeter of said communication passageway.

17. The release valve of claim 10, wherein said at least one opening includes a plurality of openings spaced around a perimeter of said combustion chamber.

18. A release valve system, comprising:
a receptacle having a fill valve, said receptacle having a gas therein; and
a release valve coupled to said receptacle, said release valve having a body;
said body comprised of a cylindrical shape and having a first end and a second end, said first end having threads and seal to threadably attach to said receptacle and said second end extends within an interior of said receptacle;
said body having a communication passage adjacent first end, said communication passage having a plurality of inlets spaced around a first perimeter of said communication passage and having an outlet to communicate with an exterior of said body;
said body having a combustion chamber linearly extending from said communication passage, said combustion chamber having a first portion and a second portion, said second portion having a plurality of heat openings spaced around a second perimeter of said second portion;
said body having a partition separating said communication passage and said combustion chamber, said partition having an opening;
said release valve including a propellant positioned within said first portion of said combustion chamber;
said release valve including an igniter in communication with said propellant, said igniter having a switch attached to an exterior of said receptacle and having an igniting end connected to said propellant for igniting said propellant via engagement of said switch;
said release valve including a valve movable within said body and extending between said first end and said second end, said valve movable from a first position to a second position via a thrust of said ignited propellant;

said valve having a first restricting element within said communication passage, said first restricting element adapted to restrict passage of said gas through said outlet in said first position and adapted to permit passage of said gas through said outlet in said second position;

said valve having a second restricting element within said combustion chamber, said second restricting element adapted to restrict passage of heat from said burned propellant through said plurality of openings in said first position and adapted to permit passage of heat from said burned propellant through said plurality of openings in said second position to interact with said gas within said receptacle and cause expansion of said gas;

said heat from said burned propellant adapted to cause gas within said receptacle to expand and said gases from said burned propellant adapted to add to volume of stored gas expunged through said plurality of openings;

said valve having a shaft connecting said first restricting element and said second restricting element;

said shaft having a first portion and a second portion, said first portion being tapered to lodge within said opening of said partition and said second portion having a cavity extending therein;

said release valve including a biasing assembly having an outer support located adjacent said second end of said body, a guide rod slidable through said outer support and extending within said cavity and a bias member extending around said guide rod between said outer support and an inner end of said cavity for providing a biasing force upon said valve towards said first position.

* * * * *